(No Model.)
F. McTAGGART.
CAR COUPLING.
No. 605,742. Patented June 14, 1898.
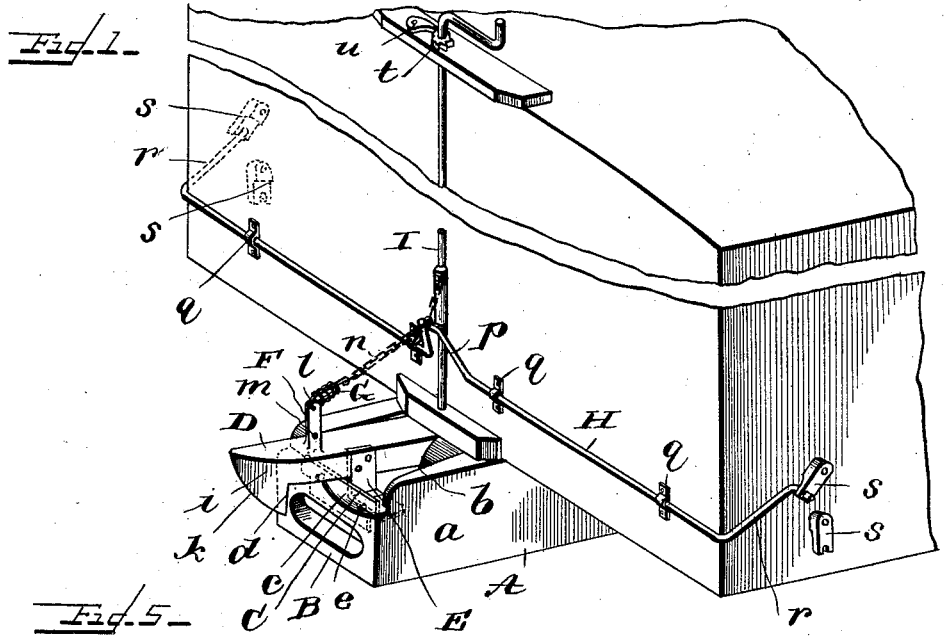
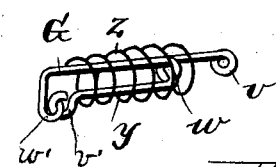
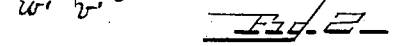
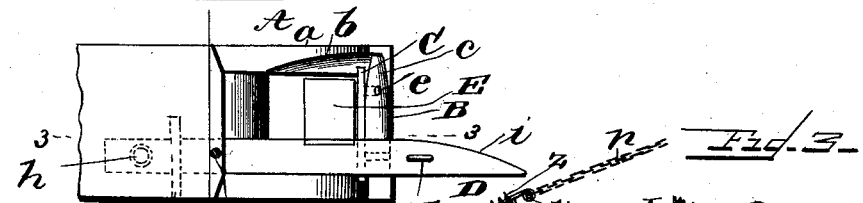
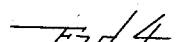
Witnesses
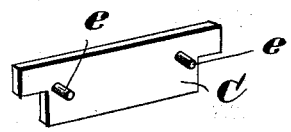
Inventor
Francis McTaggart
By D. L. Reinohl
Attorney.

UNITED STATES PATENT OFFICE.

FRANCIS McTAGGART, OF IROQUOIS, SOUTH DAKOTA.

CAR-COUPLING.

SPECIFICATION forming part of Letters Patent No. 605,742, dated June 14, 1898.

Application filed January 10, 1898. Serial No. 666,142. (No model.)

*To all whom it may concern:*

Be it known that I, FRANCIS MCTAGGART, a citizen of the United States, residing at Iroquois, in the county of Kingsbury and State of South Dakota, have invented certain new and useful Improvements in Car-Couplings; and I do hereby declare the following to be a full, clear, and exact description of the invention, such as will enable others skilled in the art to which it appertains to make and use the same.

My invention relates to car-couplings, and has reference to that class of couplings in which two gravity catch-hooks are employed, one on each two cars to be coupled, and the hook on one car engaging with the front end of the body of the coupling of the other car; and it consists in certain improvements in construction which will be fully disclosed in the following specification and claims.

In the accompanying drawings, which form part of this specification, Figure 1 is a perspective showing the application of my invention to one end of a freight-car; Fig. 2, a top plan view of the coupling; Fig. 3, a longitudinal section on line 3 3, Fig. 2; Fig. 4, a perspective of the detachable wearing-plate, and Fig. 5 an enlarged side elevation of the hook and its guard.

Reference being had to the drawings and the letters thereon, A indicates the body of a draw-bar, having a transverse bar B at its front end, with which the hook of another coupling engages. The side $a$ of the draw-bar is cut away at $b$ to allow the hook to ride into place easily, and the upper and outer edge of the bar D is rounded at $c$ to provide an easy engagement of the hook and avoid jar in coupling. The draw-bar is open between its two sides to afford room for the hook attached thereto and the hook of another draw-bar which engages its transverse bar B.

C indicates the hook wearing-plate, which is detachably or removably secured to the inside of the transverse bar B and receives the wear of the shoulder $d$ of the hook and is renewed when it becomes worn to provide a good biting-surface for the shoulder $d$ of the hook. This plate is preferably made of cast-steel and is supported in place on pins or studs $e$ $e$, which engage holes $f$ in the bar B.

D indicates the hook, which is secured to the sides of the draw-bar by a transverse pin $g$, upon which the hook swings vertically, and at the rear end of the hook a spring $h$ is inserted, which serves to insure positive and quick action of the hook in coupling. The spring also serves to hold or keep the hook in engagement with an adjacent draw-bar until it is raised by an attendant to uncouple the cars. The hook is rounded on its inner side at $i$ to cause a ready guiding action of the hook as it engages with another and cause the opposing hook to be directed into position for engagement with the bar B of the draw-bar, and the hook is further rounded on its lower front end at $k$ to cause it to ride up and over the rounded portion $c$ of the bar $b$.

On the inside of the hook is secured a right-angled plate E, over which the hook of an adjacent car rests and which serves to raise said hook out of engagement with the draw-bar, so that in raising one hook by the means employed for the purpose both hooks are raised simultaneously and disengaged from the ends of the draw-bars and uncoupled.

F indicates an arm secured to the upper side of the hook, near its front end, and is provided with an upper hole or opening $l$ and a lower opening $m$, with either of which a hook G engages, and the hook is secured to a chain $n$, which engages with the arm $p$ of a crank-shaft H and also with a revoluble rod I, which extends to the top of a car, so that a car may be uncoupled by either means.

The crank-shaft is secured to the end of the car by suitable bearings $q$ $q$ and is provided with an arm $r$ at each end, set at an angle to counterbalance the arm $p$ and thus neutralize its weight in raising the hook D. The hook may be retained in its raised position for shunting in making up trains or shifting cars about a yard when coupling of cars is not desired, and the arms $r$ may be locked or secured in any desired position by turn-buttons $s$ on the sides of the car.

By the construction of crank-shaft shown the hook D may be raised from either side of the car, and when raised by the rod I the hook is secured by the ratchet-wheel $t$ on the rod and the pawl or dog $u$ on the car.

The body of the hook G is provided with a loop or eye $v$, with which the chain engages, an eye $w$, with which the free end of the tongue member *y* engages, and is connected to the body of the hook at its rear end by an eye *v'*, which engages with an eye *w'*, and surrounding the hook is a guard *z* to prevent the tongue becoming accidentally detached.

Having thus fully described my invention, what I claim is—

1. A car-coupling having a transverse bar at its front end and vertical sides extending above said end, the transverse bar rounded at *c* and the side cut away at *b*, and a wearing-plate detachably applied to the front end on the inside thereof, in combination with a hook provided with a rounded inner and a rounded under side and a right-angled plate attached to the inner side of the hook.

2. A car-coupling provided with a vertically-movable hook, a shaft having a crank thereon and a chain attached to said crank, in combination with a hook connected to said chain and having an eye *w* and an eye *w'* in the body thereof, a tongue connected to the eye *w'* of the hook and engaging the eye *w* at its free end and a guard surrounding the body of the hook and the tongue.

In testimony whereof I affix my signature in presence of two witnesses.

FRANCIS McTAGGART.

Witnesses:
O. J. KRUEGER,
LEWIS McTAGGART.